(12) United States Patent
Le Duff et al.

(10) Patent No.: US 10,730,205 B2
(45) Date of Patent: Aug. 4, 2020

(54) MOLD

(71) Applicant: RSI HOME PRODUCTS MANAGEMENT, INC., Anaheim, CA (US)

(72) Inventors: Damian J. Le Duff, Chula Vista, CA (US); Manuel Alvarez, Ontario, CA (US)

(73) Assignee: RSI HOME PRODUCTS MANAGEMENT, INC., Anaheim, CA (US)

( * ) Notice: Subject to any disclaimer, the term of this patent is extended or adjusted under 35 U.S.C. 154(b) by 211 days.

(21) Appl. No.: 15/852,877

(22) Filed: Dec. 22, 2017

(65) Prior Publication Data
US 2018/0243949 A1    Aug. 30, 2018

Related U.S. Application Data

(62) Division of application No. 14/444,835, filed on Jul. 28, 2014, now Pat. No. 9,878,469.
(Continued)

(51) Int. Cl.
| | |
|---|---|
| *B29C 33/44* | (2006.01) |
| *B29C 33/50* | (2006.01) |
| *B29C 70/44* | (2006.01) |
| *B29C 37/00* | (2006.01) |
| *B29C 33/58* | (2006.01) |
| *B29K 103/08* | (2006.01) |

(Continued)

(52) U.S. Cl.
CPC ............. *B29C 33/44* (2013.01); *B29C 33/50* (2013.01); *B29C 37/0025* (2013.01); *B29C 70/44* (2013.01); *B29C 33/405* (2013.01); *B29C 33/58* (2013.01); *B29K 2103/08* (2013.01); *B29K 2995/0046* (2013.01); *B29L 2031/7698* (2013.01)

(58) Field of Classification Search
None
See application file for complete search history.

(56) References Cited

U.S. PATENT DOCUMENTS 2,083,484 A * 6/1937 Zampol .................. B29C 33/50
                                                           428/128
3,433,860 A * 3/1969 Ruggles .................. B29C 39/10
                                                           264/71
(Continued)

FOREIGN PATENT DOCUMENTS

| DE | 845261 | * | 6/1951 | |
|---|---|---|---|---|
| EP | 1114715 A1 | * | 7/2001 | ......... B29C 45/1418 |
| JP | 59196219 | * | 4/1983 | |

*Primary Examiner* — Seyed Masoud Malekzadeh
*Assistant Examiner* — Manley L Cummins, IV
(74) *Attorney, Agent, or Firm* — Knobbe, Martens, Olson & Bear, LLP

(57) ABSTRACT

The improved mold assembly for cultured marble molding is provided. The mold assembly can comprise a male mold portion and a female mold portion. The assembly can further comprise a molding tool. The molding tool can have a side wall having an upper curved portion and a lower curved portion. The molding tool can have a bowl portion and an apron portion spaced from the bowl portion by a gap. The molding tool can be constructed from a flexible and/or soft material. The molding tool can facilitate molding of a countertop having at least one seamless curved edge and/or an at least partially seamless sink portion.

16 Claims, 14 Drawing Sheets

Related U.S. Application Data

(60) Provisional application No. 61/876,198, filed on Sep. 10, 2013, provisional application No. 61/875,689, filed on Sep. 10, 2013.

(51) Int. Cl.
  *B29L 31/00* (2006.01)
  *B29C 33/40* (2006.01)

(56) References Cited

U.S. PATENT DOCUMENTS

| | | | |
|---|---|---|---|
| 3,673,617 A * | 7/1972 | Schulz, Jr. | B29C 44/12 |
| | | | 4/631 |
| 4,235,948 A | 11/1980 | Holmes | |
| 4,894,272 A * | 1/1990 | Aisley | B29C 39/026 |
| | | | 428/119 |
| 5,087,193 A | 2/1992 | Herbert, Jr. | |
| 5,134,002 A * | 7/1992 | Vallier | B29C 31/08 |
| | | | 249/112 |
| 5,275,547 A | 1/1994 | Brown | |
| 5,683,638 A * | 11/1997 | Crigler | B29C 37/0082 |
| | | | 264/162 |
| 5,885,503 A | 3/1999 | Bordener | |
| 5,948,333 A * | 9/1999 | Blackmon | B29C 37/0032 |
| | | | 264/255 |
| 6,000,673 A | 12/1999 | Bordener | |
| 6,083,339 A | 7/2000 | Peters et al. | |
| 2004/0046280 A1 | 3/2004 | Harrington | |
| 2004/0089965 A1 | 5/2004 | Malfliet et al. | |
| 2004/0121161 A1 | 6/2004 | Shugert et al. | |
| 2004/0222550 A1 | 11/2004 | Baldoni | |
| 2007/0063378 A1 | 3/2007 | O'Donoghue | |
| 2010/0075083 A1 | 3/2010 | Harbaugh | |
| 2010/0132109 A1* | 6/2010 | Kim | A47K 3/02 |
| | | | 4/584 |
| 2013/0309511 A1* | 11/2013 | Le Duff | B28B 1/008 |
| | | | 428/454 |
| 2014/0259362 A1 | 9/2014 | Zimbric | |
| 2015/0021458 A1 | 1/2015 | Zorovich et al. | |

* cited by examiner

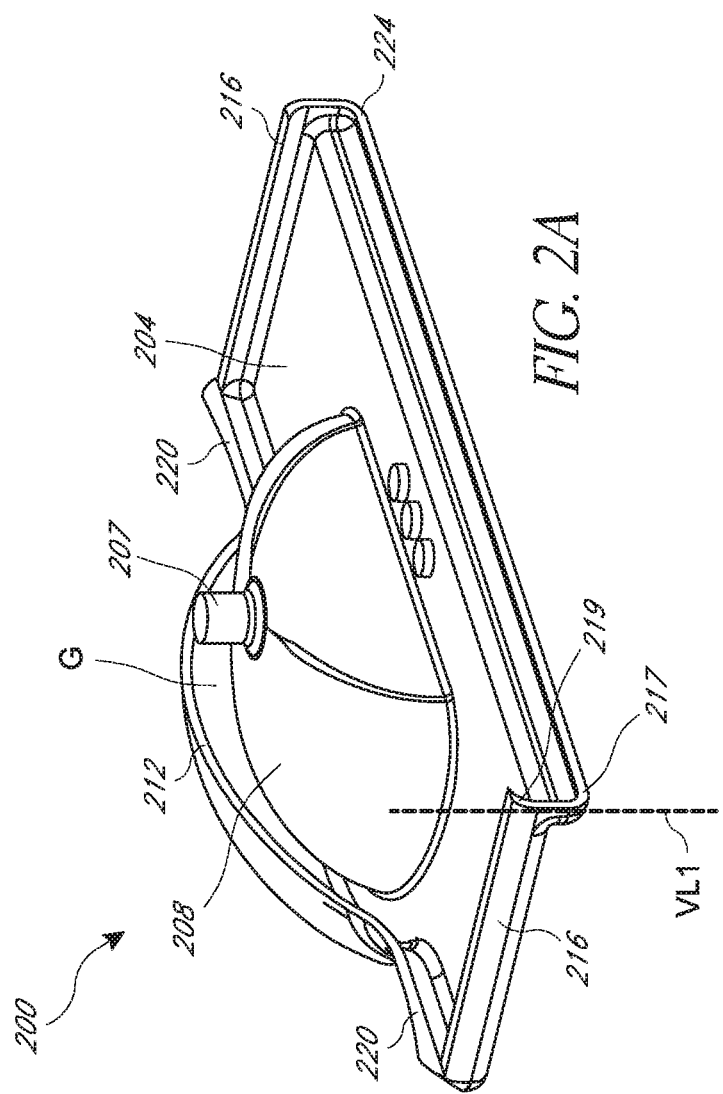

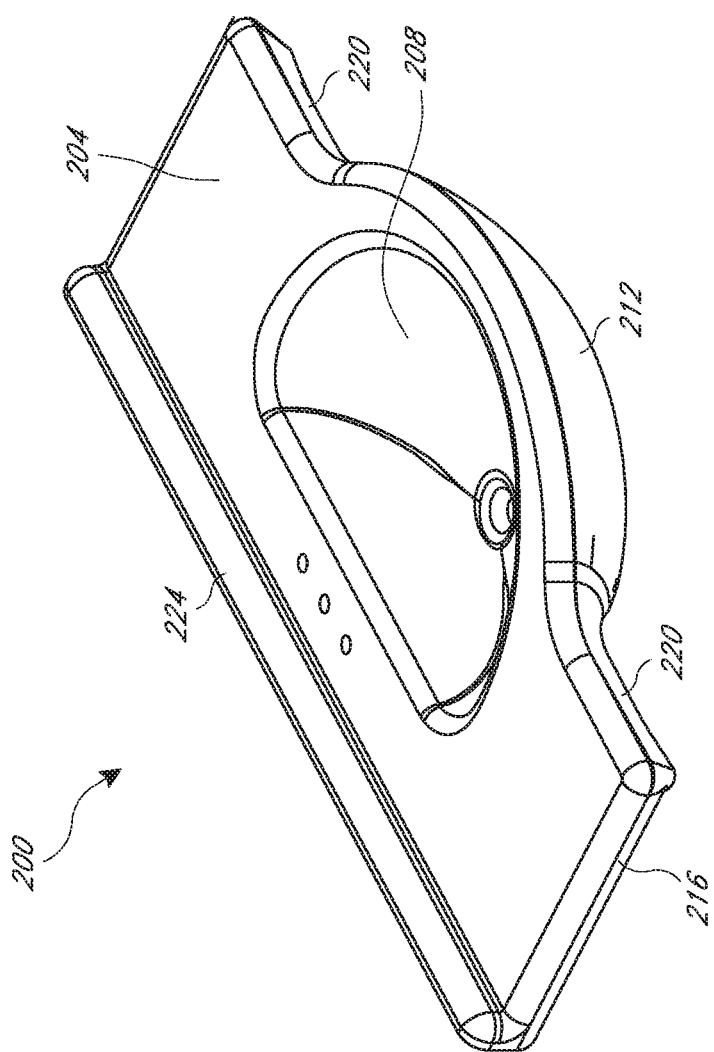

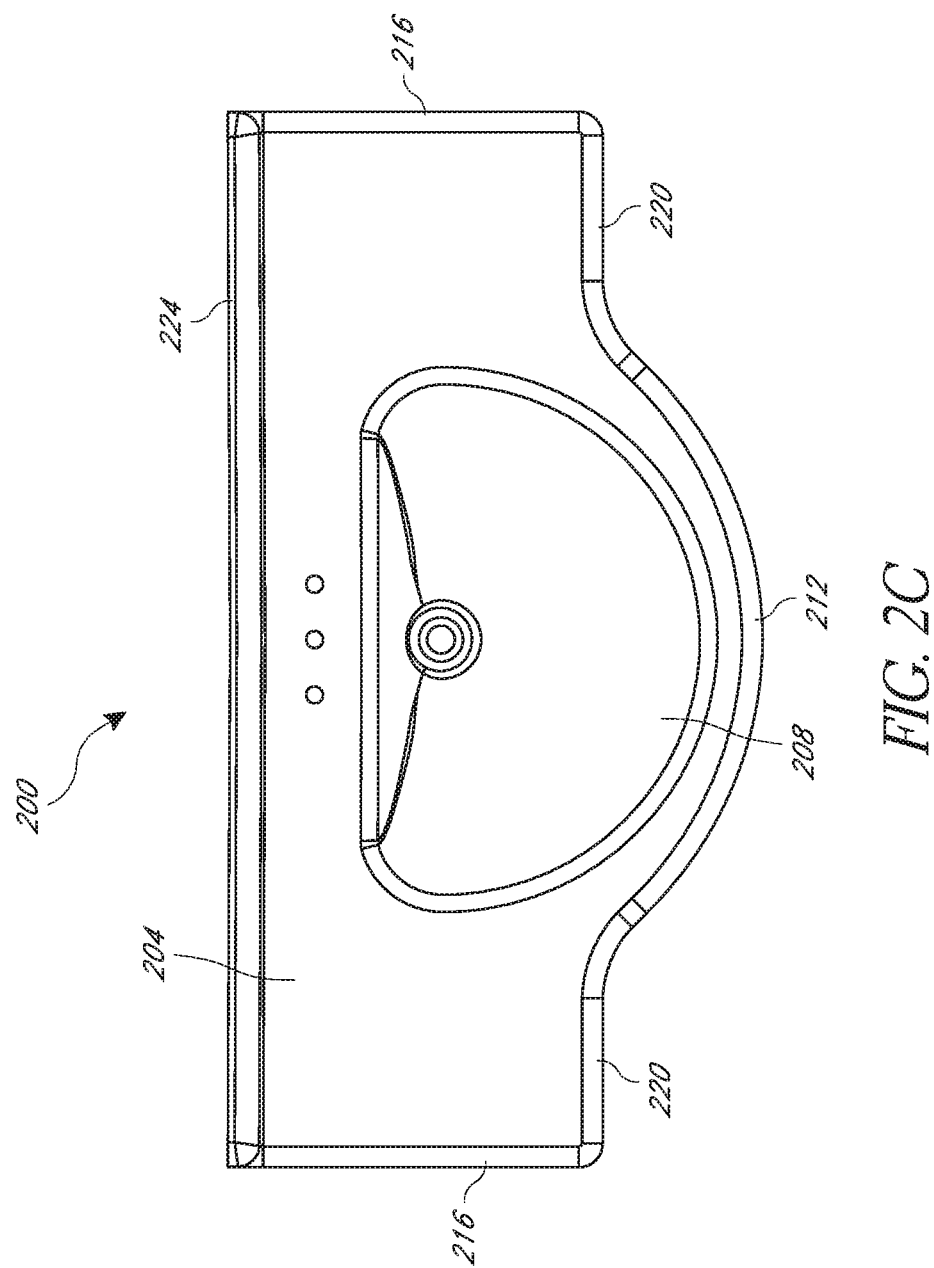

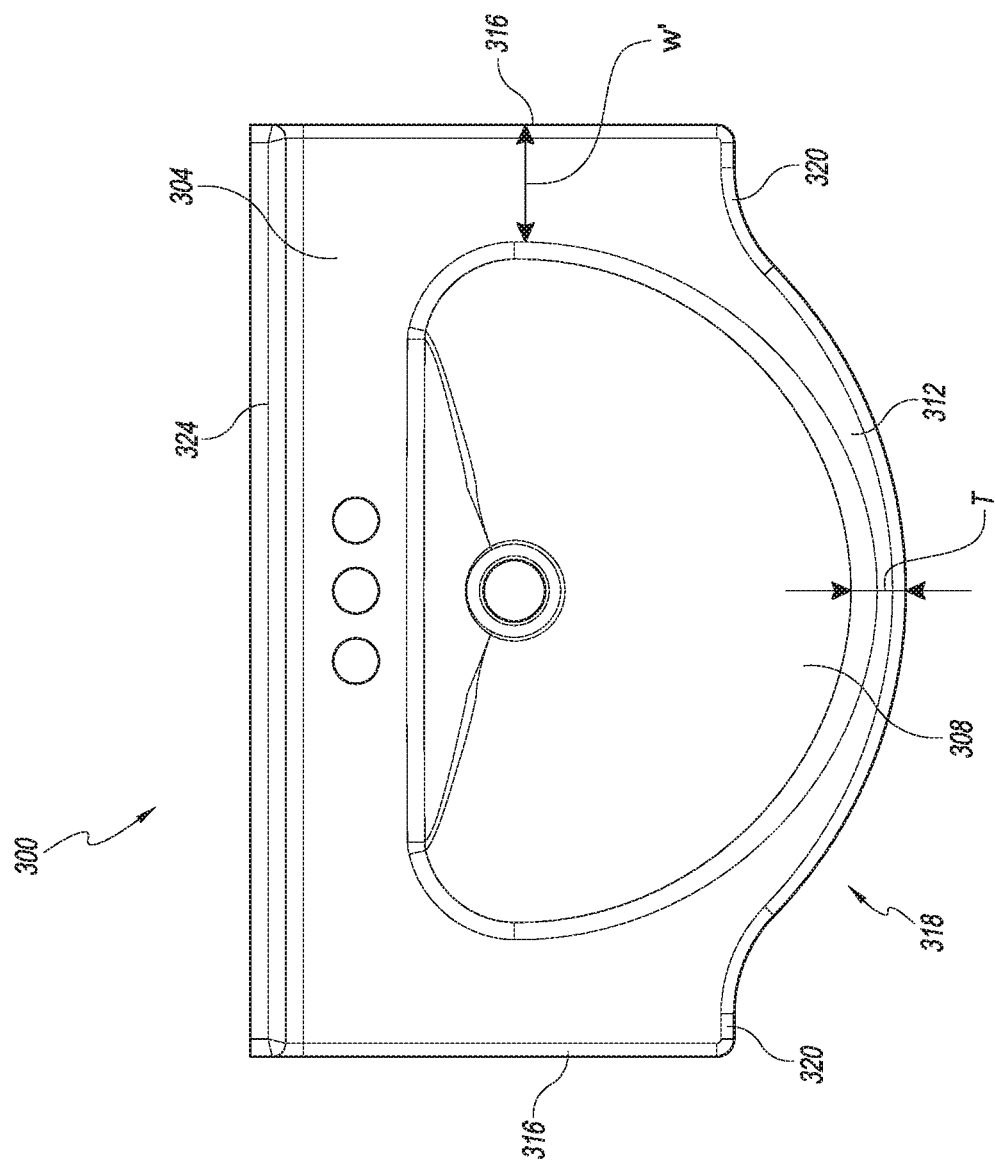

MOLD

CROSS-REFERENCE TO RELATED APPLICATIONS

This application is a divisional of U.S. patent application Ser. No. 14/444,835, filed Jul. 28, 2014, which claims benefit under 35 U.S.C. § 119(e) to U.S. Provisional Patent Application No. 61/875,689, filed Sep. 10, 2013, which is incorporated in its entirety by reference herein. U.S. patent application Ser. No. 14/444,835 also claims benefit under 35 U.S.C. § 119(e) to U.S. Provisional Patent Application No. 61/876,198, filed Sep. 10, 2013, which is incorporated in its entirety by reference herein. Any and all priority claims identified in the Application Data Sheet, or any correction thereto, are hereby incorporated by reference under 37 CFR 1.57.

BACKGROUND

Technical Field

This application relates to improved molding tools for molding countertops and other structures.

Description of the Related Art

Countertops (e.g., cultured marble countertops) have traditionally been produced in fiber glass reinforced plastic (FRP) molds. For example, two or more mold plates may be mated together in a mating direction to form an internal mold space. Traditionally, FRP molds utilized a positive draft (e.g., a mold in which every molding surface of every mold component is visible when viewed parallel to the mating direction). In many cases, traditional FRP molds are incapable of utilizing negative drafts (e.g., mold drafts wherein some molding surfaces are hidden from view when viewed along the mating direction).

SUMMARY

A mold assembly may comprise: a mold frame assembly having a male mold portion and a female mold portion configured to removably mate with the male mold portion, the mold frame defining a mold interior when the male mold portion is mated with the female mold portion; a flexible insert configured to fit within the mold interior, the flexible insert having: a bowl portion having a product surface and mold engaging surface configure to releasably mate with a bowl protrusion on the male mold portion; and an apron integral with the bowl portion, the apron portion having a product surface separated from the product surface of the bowl portion by a gap, the apron portion configured to fit within an apron cavity of the female mold portion; the mold frame assembly and the flexible insert define a product mold volume when the male mold portion is mated with the female mold portion and the bowl portion is mated with the bowl protrusion, the product mold volume defining a product bowl space at least partially defined by the bowl portion and the apron.

A method of molding a countertop with an integral bowl may comprise: providing a male mold portion having countertop mold projections; providing a flexible insert having a bowl portion having a mold surface and a product surface, the flexible insert having an apron portion integral with the bowl portion and spaced from the bowl portion by a gap distance, the apron portion having a product surface facing the product surface of the bowl portion and separated from the product surface of the bowl portion by the gap distance; spraying the product surfaces of the bowl portion and the apron portion with a gel coat; releasably mating the mold surface of the bowl portion to the male mold; providing a female mold portion having countertop mold recesses; releasably mating the female mold portion to the male mold portion such that the flexible insert is positioned between the female mold portion and the male mold portion, a space between the mated female mold portion and male mold portion defining a mold volume; injecting a composite matrix material into the mold volume, wherein the composite matrix material solidifies after a setting time to form a countertop having at least one of a seamless front side and a seamless side end; unmating the female mold portion from the male mold portion after the setting time has taken place; and removing the flexible insert from the countertop.

A mold assembly may comprise: a mold frame assembly having a male mold portion and a female mold portion configured to removably mate with the male mold portion at least partially on a mating plane, the mold frame defining a mold interior when the male mold portion is mated with the female mold portion; and a flexible insert configured to fit within the mold interior, the flexible insert having: a main body portion having an outer perimeter; and at least one sidewall extending from the outer perimeter of the main body portion, the sidewall having an upper curved portion and a lower curved portion, both the upper curved portion and the lower curved portion curved toward the main body portion from a vertical plane perpendicular to the mating plane and tangential to the outer perimeter of the main body portion of the flexible insert; wherein the mold frame assembly and the flexible insert define a product mold volume when the male mold portion is mated with the female mold portion and the bowl portion is mated with the bowl protrusion, the product mold volume having at least one side portion having an upper curved portion and a lower curved portion, the side portion being seamless along and between the upper curved portion and the lower curved portion of the side portion.

A method of molding a countertop may comprise: providing a male mold portion having countertop mold projections; providing a female mold portion having countertop mold recesses, the female mold portion configured to releasably mate with the male mold portion at least partially on a mating plane; providing a flexible insert having a main body portion having an outer perimeter and at least one sidewall extending from the outer perimeter of the main body portion, the sidewall having an upper curved portion and a lower curved portion, both the upper curved portion and the lower curved portion curved toward the main body portion from a vertical plane perpendicular to the mating plane and tangential to the outer perimeter of the main body portion of the flexible insert; spraying one or more surfaces of the flexible insert with a gel coat; releasably mating the flexible insert with one of the male mold portion and the female mold portion; releasably mating the female mold portion to the male mold portion such that the flexible insert is positioned between the female mold portion and the male mold portion, a space between the mated female mold portion and male mold portion defining a mold volume; injecting a composite matrix material into the mold volume, wherein the composite matrix material solidifies after a setting time to form a countertop having at least one side portion having an upper curved portion and a lower curved portion, both the upper curved portion and the lower curved portion of the side portion curved toward a counter portion of the countertop from a vertical plane perpendicular to the mating plane and tangential to an outer perimeter of the counter portion of the countertop, the side portion being seamless along and between the upper curved portion and the lower curved portion of the side portion; unmating the female mold portion from the male mold portion after the setting time has taken place; and removing the flexible insert from the countertop.

BRIEF DESCRIPTION OF THE DRAWINGS

These and other features and advantages of the present embodiments will become more apparent upon reading the following detailed description and with reference to the accompanying drawings of the embodiments, in which:

FIG. 2A is a bottom perspective view of an embodiment of a molding tool.

FIG. 2B is a top perspective view of the molding tool of FIG. 2A.

FIG. 2C is a top elevation view of the molding tool of FIG. 2A.

FIG. 5 is a top elevation view of the molded product of FIG. 4.

DETAILED DESCRIPTION

An improved mold assembly is disclosed herein. The embodiments disclosed herein are described in the context of a mold assembly for use in modeling sinks and countertops because the embodiments disclosed herein have particular utility in this context. However, the embodiments and inventions herein can also be applied to molding other types of solid surface products, including but not limited to tabletops, cutting boards, floor tiles, sculptures or other products.

Figure 1:
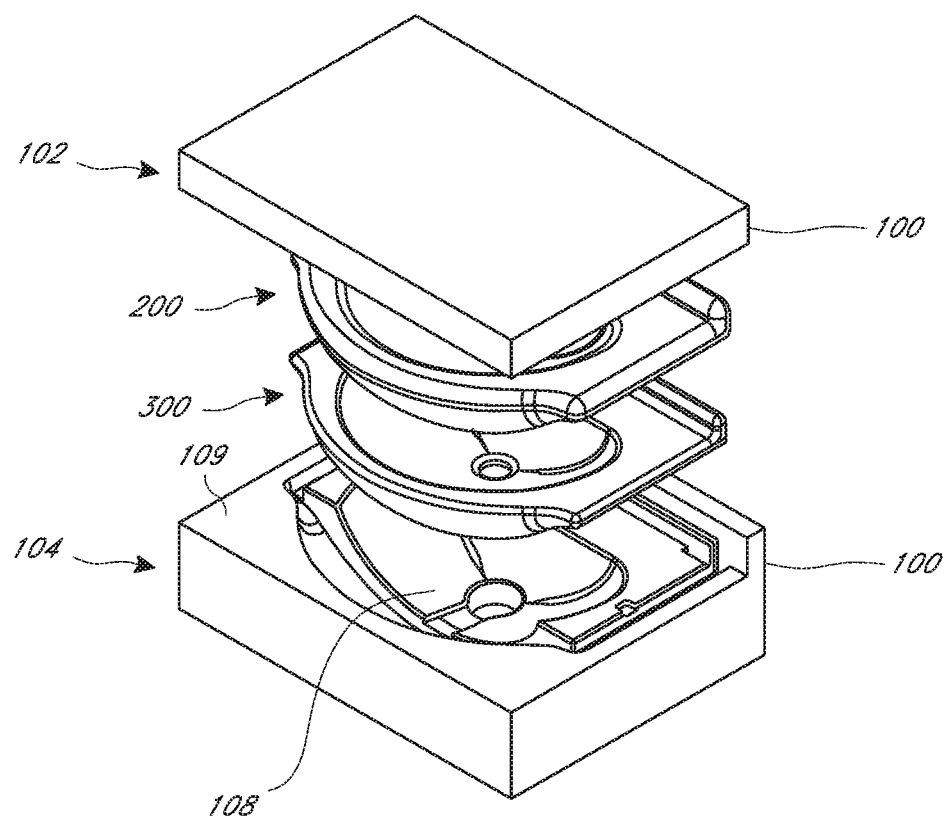
FIG. 1 is a perspective exploded view of an embodiment of a mold assembly.

A mold assembly 100 can include a male mold portion (e.g., male mold plate 102) and a female mold portion (e.g., female mold plate 104). The male mold plate 102 and female mold plate 104 can be configured to releasably mate with each other. The male mold plate 102 and female mold plate 104 can each form, separately or in combination, a mother tool. In some embodiments, more than two (e.g., 3, 4, 6, 10, 15, etc.) mold plates may be combined to form a mother tool. When mated, the mold plates 102, 104 may define a mold interior (e.g., the volume of space between the mold plates 102, 104 when the mold plates 102, 104 are mated). As illustrated in FIG. 1, the mold plates 102, 104 can mate along a mating plane (e.g., the plane defined by the top surface 109 of the female mold plate 104). In some embodiments, the mold plates 102, 104 are oriented as shown in FIG. 1 during the molding process (e.g., female mold plate 104 beneath male mold plate 102). In some embodiments, the female mold plate 104 is positioned above the male mold plate 102 during the molding process. In some cases, the mold plates 102, 104 are positioned beside each other or at some other relative orientation during the molding process.

Figure 1A:
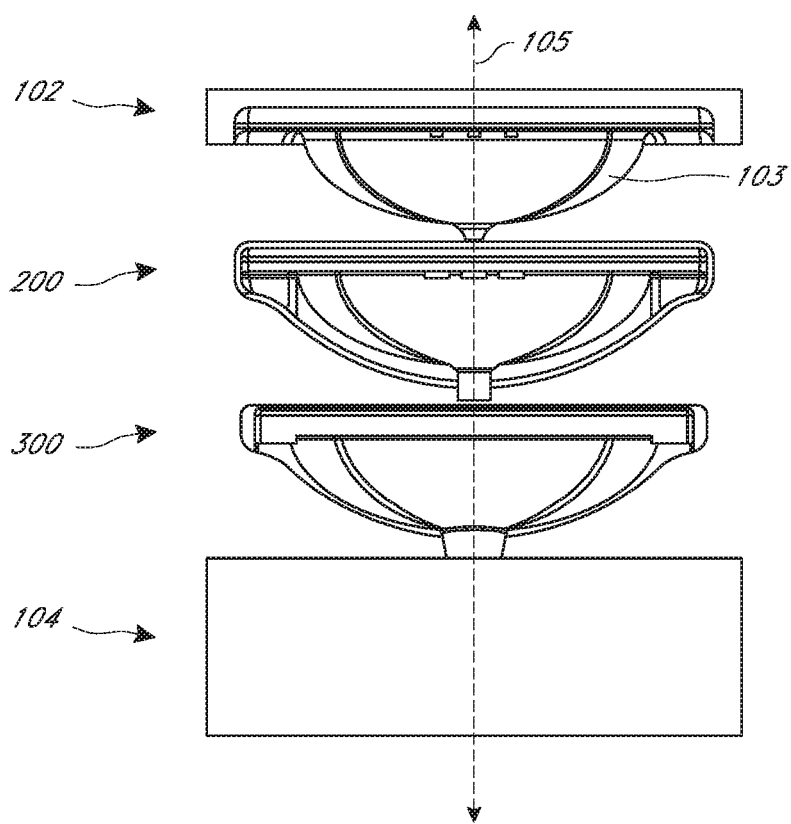
FIG. 1A is a rear exploded view of the mold assembly of FIG. 1.

The female mold plate 104 can include one or more cavities/recesses 108 for receiving a molding or soft tool (e.g., a flexible insert 200) and/or for defining a shape of a molded product 300. As illustrated in FIG. 1A, the male mold plate 102 can include one or more protrusions 103 for receipt by the flexible insert 200 and/or for defining a shape of the molded product 300.

Figure 2D:
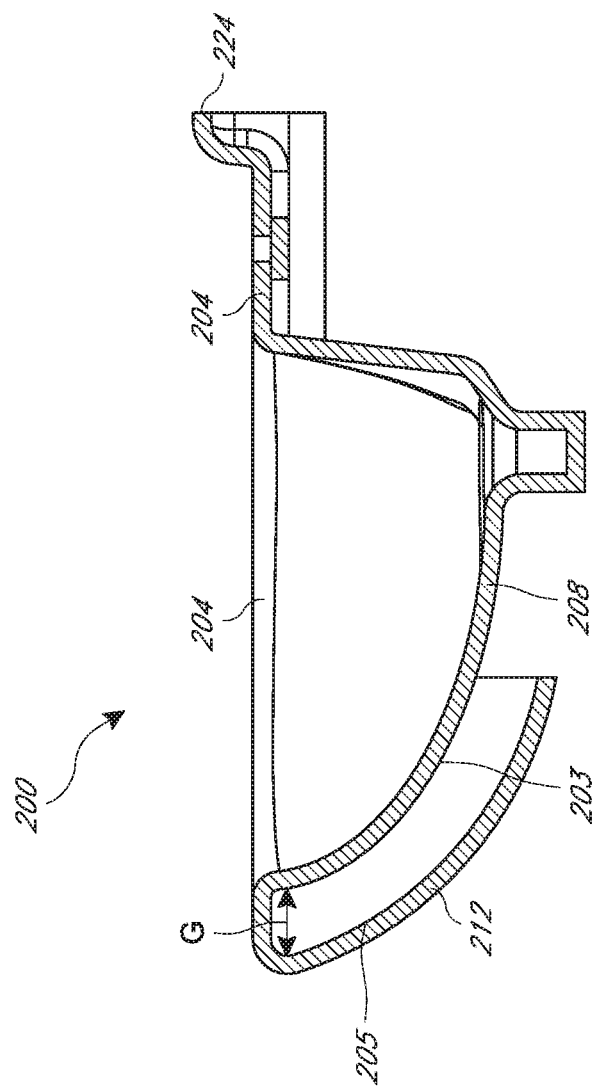
FIG. 2D is a side cross-section view of the molding tool of FIG. 2A.

As illustrated in FIG. 2A, the flexible insert 200 can include a main body portion 204. Portions of or the entire flexible insert 200 can be constructed from a soft and/or flexible material (e.g., rubber, polymers, latex, or other soft and/or flexible materials). The flexible insert 200 can include a bowl portion 208 projecting from the main body portion 204. Preferably, the bowl portion 208 and the main body portion 204 form a monolithic part. The bowl portion 208 can have a product surface (e.g., the convex surface of the bowl portion 208) and a mold engagement surface (e.g., the concave surface of the bowl portion 208). In some embodiments, the product surface of the bowl portion 208 comprises the first opposing surface 203 of the bowl portion 208 opposing a second opposing surface 205 of an apron 212, as illustrated in FIG. 2D and described below. The mold engagement surface can be configured to releasably mate with the male mold plate 200 (e.g., with one or more protrusions 103 on the male mold portion).

The main body portion 204 may have an outer perimeter from which sidewalls 216 and front walls 220 project. A portion of the outer perimeter of the main body portion 204 may include a back wall 224. The walls 216, 220 are preferably integral with the main body portion 204 to form a monolithic part. The front walls 220 and/or sidewalls 216 can include an upper curved portion 219 and a lower curved portion 217 (upper and lower corresponding to the orientation of the insert when the insert is positioned with the drain opening 207 facing upward, as in FIG. 2A). For example, the sidewalls 216 can include an upper curved portion 219 that curves inward (e.g., toward the body portion 204) from a vertical plane. The vertical plane can be plane tangential to a point on the outer perimeter of the main body portion 204. The vertical plane may be parallel to a vertical line VL1 (e.g., see FIG. 2A) and/or perpendicular to a plane on which the main body portion 204 lies. In some embodiments, the vertical plane is perpendicular to the mating plane of the male mold plate 102 and the female mold plate 104. In some embodiments, the vertical plane is parallel to a separation line 105 of the two mold portions (e.g., the direction in which one or both of the mold plates 102, 104 is moved to mate and unmate from the other mold plate 102, 104). The sidewalls 216 may include a lower curved portion 217 that curves inward (e.g., toward the body portion 204) from a vertical plane (e.g., the vertical plane as described above). In some embodiments, the back wall 224 lies at least partially on a vertical plane on a back side of the tool 200. The sidewalls 216 can be seamless (e.g., lacking in any seam produced by the interface of two or more components of the mold assembly 100—such as between the male mold plate 102 and the female mold plate 104) between the upper curved portions 219 and the lower curved portions 217. In some embodiments, the sidewalls 216 and/or front wall 220 have negative drafts. In some embodiments, the sidewalls 216 and/or the front wall 220 have structural detailing (e.g., protrusions, indentations, artistic patterns, ribs, etc.). The structural detailing of the sidewalls 216 and/or of the front wall 220 can be located on and/or between the upper curved portions 219 and the lower curved portions 217. The upper curved portion 219 and/or the lower curved portion 217 may have a radius of curvature of greater than or equal to ⅛ inches. In some embodiments the radius of curvature of the curved portions 217, 219 is greater than or equal to 0.25 inches. In some embodiments curved portion can define a radius. In some embodiments, the radius of curvature of the curved portions 217, 219 is greater than or equal to 1 inch. Many variations are possible, including, but not limited to, radii of curvature that vary along the lengths of the curved portions 217, 219. In some embodiments, the front walls 220 have upper and lower curved portions that are the same or similar in curvature and layout to the upper and lower curved portions 217, 219 of the sidewalls 216.

The flexible insert 200 can include an apron 212. The apron 212 can have a product surface (e.g., the concave surface of the apron 212) and a mold engaging surface (e.g., the convex surface of the apron 212). In some embodiments, the product surface of the apron 212 comprises the second opposing surface 205 of the apron 212 opposing the first opposing surface 203 of the bowl portion 208. Preferably, the apron 212 is integral with the main body portion 204 of the tool 200 (e.g., the apron 212, bowl portion 208, and main body portion 204 form a monolithic part). In some embodiments, the apron 212 connects to the main body portion 204 along a portion of the front wall 220. The product surface of the apron 212 can be spaced from the product surface of the bowl portion 208 by a gap G (e.g., see FIG. 2D). In some embodiments, the gap G is defined as the shortest distance between the spaced opposing surfaces 203, 205 (e.g., the spaced opposing product surfaces of the bowl portion 208 and the apron 212). In some embodiments, the gap G is greater than or equal to about 0.1 inches and/or less than or equal to about 12 inches. In some embodiments, the gap G is approximately ⅜ inches. In some embodiments, the gap G is approximately ½ inch, 1 inch, 2 inches, 3 inches, 4 inches, 5 inches, 6 inches, 7 inches, 8 inches, 9 inches, 10 inches, or any value therebetween. In some embodiments, the gap G is less than ¼ inches, less than ⅜ inches, less than ½ inches, less than ¾ inches, less than ⅞ inches, less than 1 inch, less than 2 inches, less than 3 inches, less than 4 inches, less than 5 inches, less than 6 inches, less than 7 inches, less than 8 inches, less than 9 inches or less than 10 inches. In some embodiments, the gap G is between ¼ inches and 8 inches, between ⅜ inches and 6 inches, or between 1 inch and 5 inches. Many variations are possible. The apron 212 can be configured to fit at least partially within an apron cavity of the female mold plate 104.

The space between the flexible insert 200 and the mold plates 102, 104 can define a product mold volume when the mold plates 102, 104 are mated together and the flexible insert 200 is mated with one or more of the mold plates 102, 104 within the mold interior. A gel coating may be applied (e.g., sprayed, painted) on the product surface of the bowl portion 208 and the apron 212. In some embodiments, the product surfaces of the bowl portion 208 and apron 212 may be sprayed and/or painted with a gel coating (e.g., a polyester gel coat) prior to and/or after mating the flexible insert with one or more of the mold plates 102, 104. For example, the apron 212 may be flexed away from the bowl portion 208 to permit access by the gel coat sprayer or other gel coat applied to the product surfaces of the bowl portion 208 and the apron 212. The flexible and/or soft material of the flexible insert 200 can be flexible enough to deflect to permit a sprayer (e.g., a gel coat sprayer as discussed below) to be positioned within 1 inch, within 2 inches, within three inches, within 4 inches, within 5 inches, or within 6 inches of the product surfaces of the bowl portion 208 and the apron 212. Some or all of the interior surfaces (e.g., the recesses of the female mold plate 104 and/or the protrusions of the male mold plate 102) may be sprayed with a gel coating prior to mating of the mold plates 102, 104. The gel coat may be sprayed on the interior surface of the mold plates 102, 104 and/or on the product surfaces of the bowl portion 208 and apron 212 in a precisely controlled layer (e.g., a substantially consistent thickness). The gel coat may be transparent, translucent, and/or opaque. In some embodiments, the gel coat has a color (e.g., white, black, gray, red, green, etc.). The gel coat may have multiple colors or textures. The product mold volume may include a product bowl portion at least partially defined by the distance (e.g., the gap G) between the apron 212 and the bowl portion 208 of the flexible insert 200.

Cultured marble, a composite matrix material, or some other solid surface material may be injected or poured into the product mold volume. For example, solid surface material may be poured through an opening in one of the male mold plate 102 and the female mold plate 104. In some cases, a composite matrix material is used to back the gel coat after the gel coat is applied to the interior surface of the mold plates 102, 104 and/or on the product surfaces of the bowl portion 208 and apron 212. For example, the composite matrix material can be poured into the product mold volume to cover the surfaces of the mold assembly 100 on which gel coat has been previously applied. In some embodiments, the solid surface material is poured through an opening at or near a sink drain portion of the female mold plate 104. The solid surface material may be left in the product mold volume until the solid surface material sets (e.g., solidifies and/or hardens). For example, the solid surface material may be left in the product mold volume until a composite set or thermoset process is completed. The use of a molding tool (e.g., the flexible insert 200) can allow for negative draft molding. In some embodiments, the flexible insert 200 is removed from the mold plates 102, 104 (e.g., the mother tool) when the setting process is complete. The flexible insert 200 may be removed from the solid surface material upon completion of the setting and/or molding process.

In some embodiments, setting of the solid surface material in the product mold volume results in the formation of a coated product (e.g., the countertop 300 of the FIGS. 1 and 3A-3D). The countertop 300 may comprise solidified solid surface material with a gel coat finish. As illustrated in FIGS. 3A-3D, the countertop 300 can include a counter portion 304. The counter portion 304 may have an outer periphery defined by side ends 316, a front end 318, and a back end 324. The countertop 300 may include a sink portion 308. The sink portion 308 and countertop 300 may form a monolithic part. The sink portion 308 can have an outer rim 312. The outer rim 312 may be seamless. The sink portion 308 may be at least partially formed within the product bowl portion of the product mold volume. The sink portion 308 can be integral with the counter portion 304. The sink portion 308 may be seamless. In some embodiments, the front end 318 of the counter portion 304 includes two outer front portions 320 and the outer rim 312.

The side ends 316 and/or front end 318 of the counter portion 304 may be seamless. In some embodiments, the front end 318 and/or side ends 316 can include an upper curved portion 319 and a lower curved portion 317. For example, side ends 316 can include an upper curved portion 319 that curves inward (e.g., toward the counter portion 304) from a vertical plane. In some embodiments, as illustrated in FIG. 4A, the side ends 316 include an upper curved portion or a lower curved portion, but not both. The vertical plane can be plane tangential to a point on the outer perimeter of the counter portion 304. The vertical plane may be parallel to a vertical line VL2 (e.g., see FIG. 3B) and perpendicular to a plane on which the counter portion 304 lies. In some embodiments, the vertical plane is perpendicular to the mating plane of the male mold plate 102 and the female mold plate 104. The side ends 316 may include a lower curved portion 317 that curves inward (e.g., toward the counter portion 304) from a vertical plane as described above. For example, the vertical plane can be parallel to the separation line 105 described above. In some embodiments, the back end 324 lies at least partially on a vertical plane on a back side of the countertop 300. The side ends 316 can be seamless. The upper curved portion 319 and/or the lower curved portion 317 of the side ends 316 and/or front end 318 may have a radius of curvature to match the radii of curvature of the upper and lower curved portions 219, 217 of the flexible insert 200.

Figure 3A:
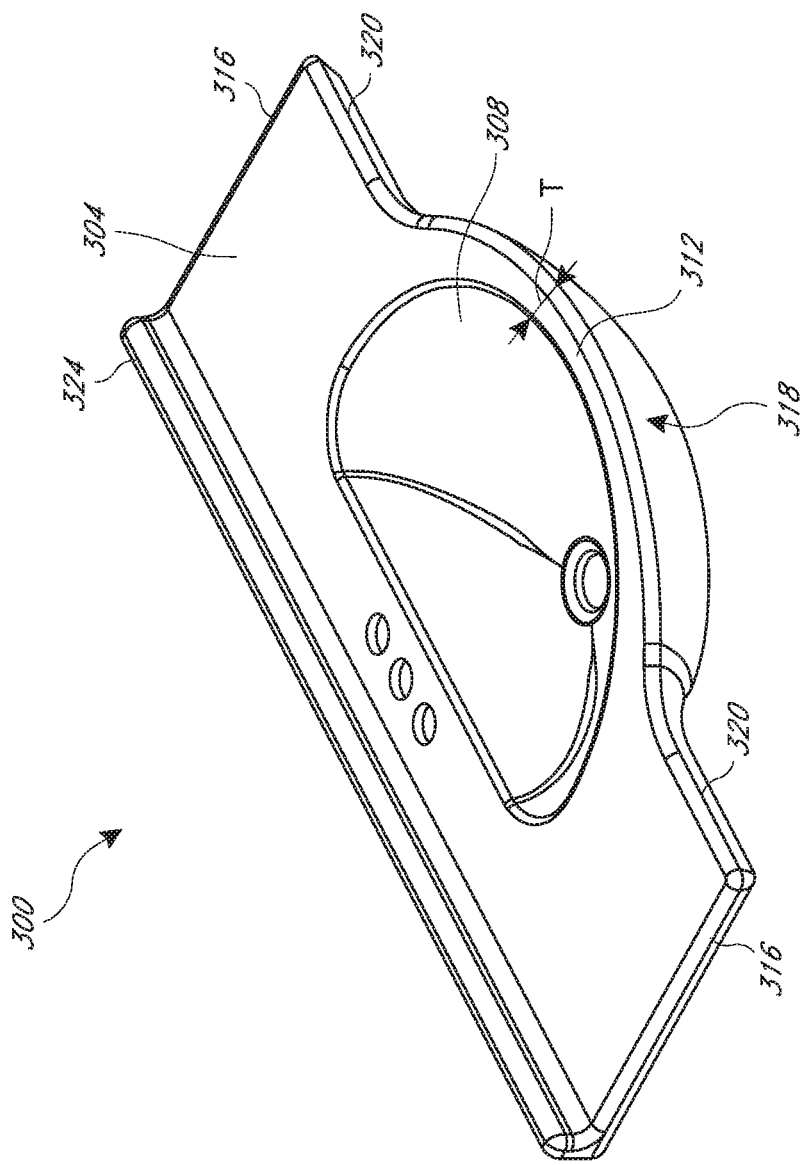
FIG. 3A is a top perspective view of an embodiment of a molded product.
Figure 3B:
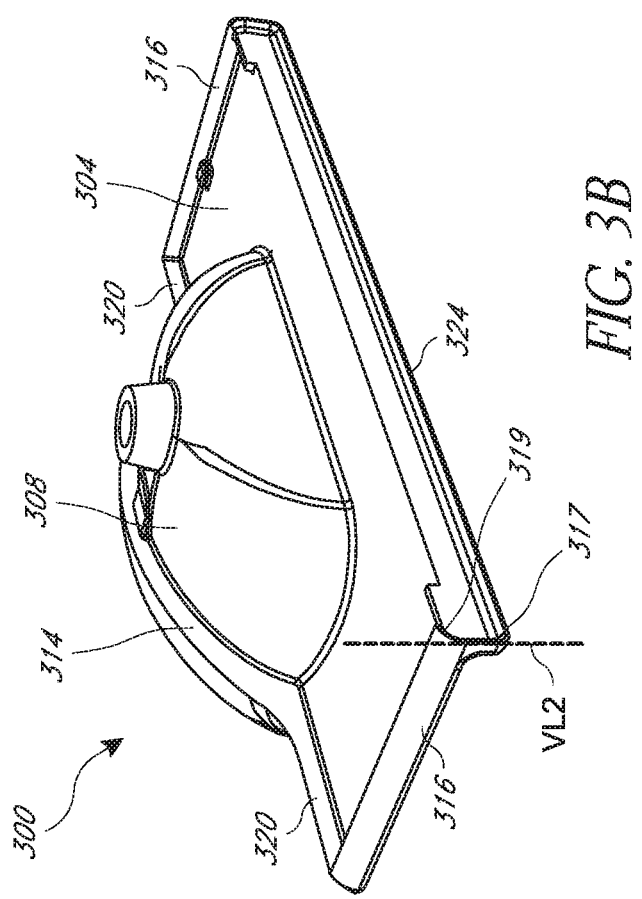
FIG. 3B is a bottom perspective view of the molded product of FIG. 2A.
Figure 3C:
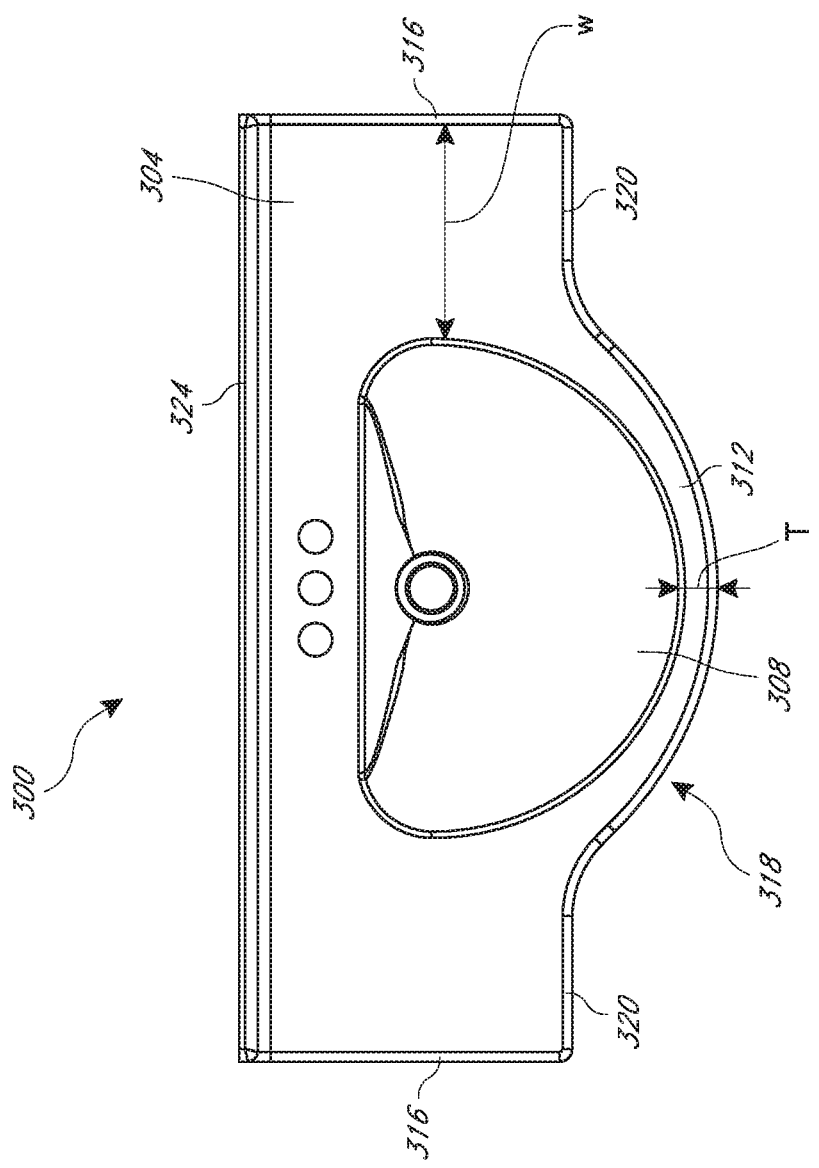
FIG. 3C is a top elevation view of the molded product of FIG. 2A.
Figure 3D:
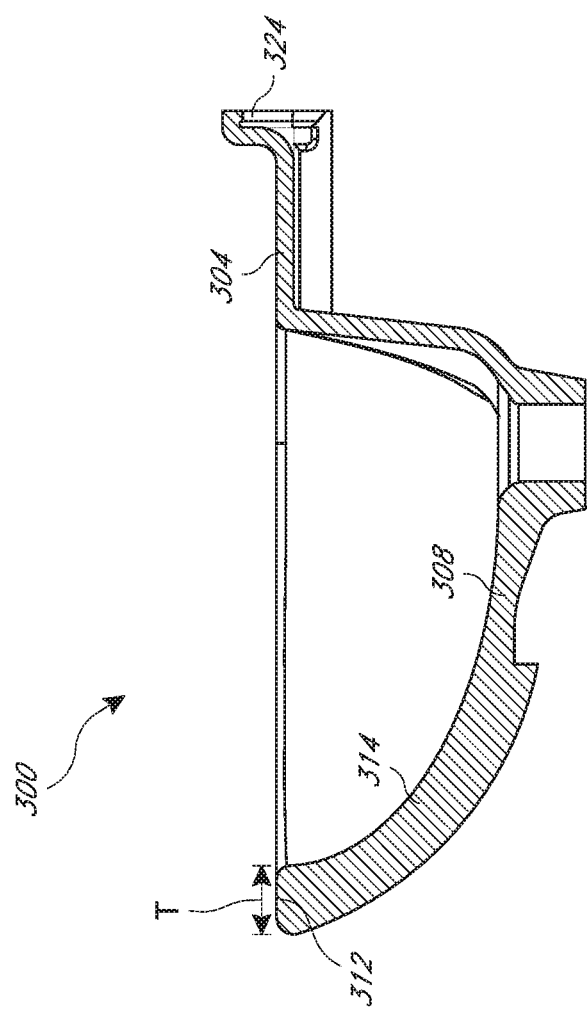
FIG. 3D is a side cross-section view of the molded product of FIG. 2A.

As illustrated in FIGS. 3A-3D, the sink portion 308 of the countertop 300 may have a rim 312. The rim 312 may have a thickness T (e.g., a thickness measured substantially parallel to the counter portion 304 and substantially perpendicular to a point on the concave surface of the rim 312). As illustrated in FIG. 3D, the sink portion 308 may have an apron-formed portion 314 have a thickness similar to or the same as the thickness T of the rim 312. The thickness T may be similar to or substantially the same as the gap G of the flexible tool 200 used to form the countertop 300. In some embodiments, the thickness T may be substantially the same as a thickness of the sink portion 308 outside the apron-formed portion 314 (e.g., the sink portion 308 may have a substantially uniform thickness). As illustrated, the width W of the counter portion 304 can be similar to or substantially the same as the distance between the sidewalls 216 of the flexible tool 200 and the bowl portion 208 of the flexible tool 200.

Figure 4:
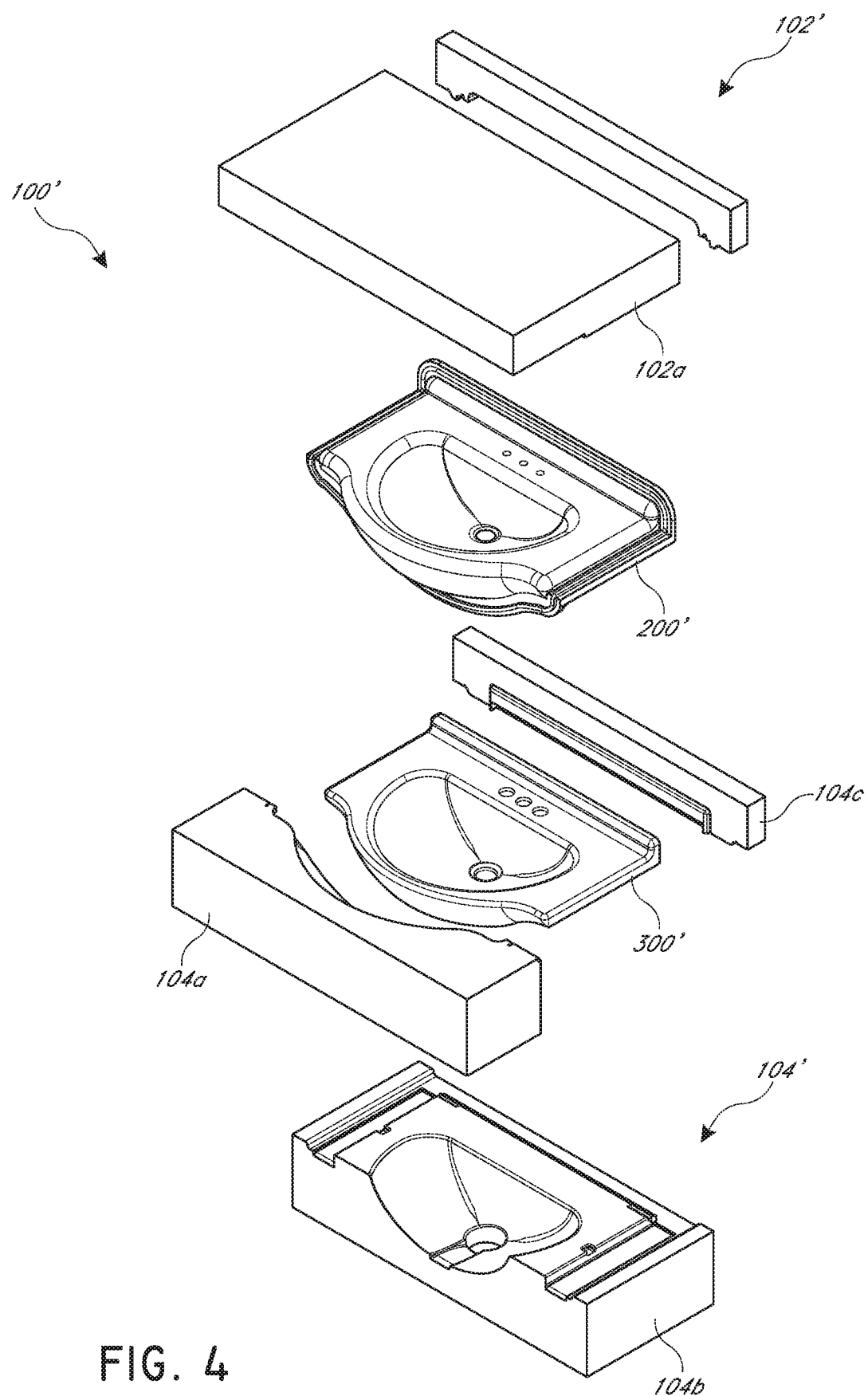
FIG. 4 is a top perspective exploded view of another embodiment of a mold assembly.
Figure 4A:
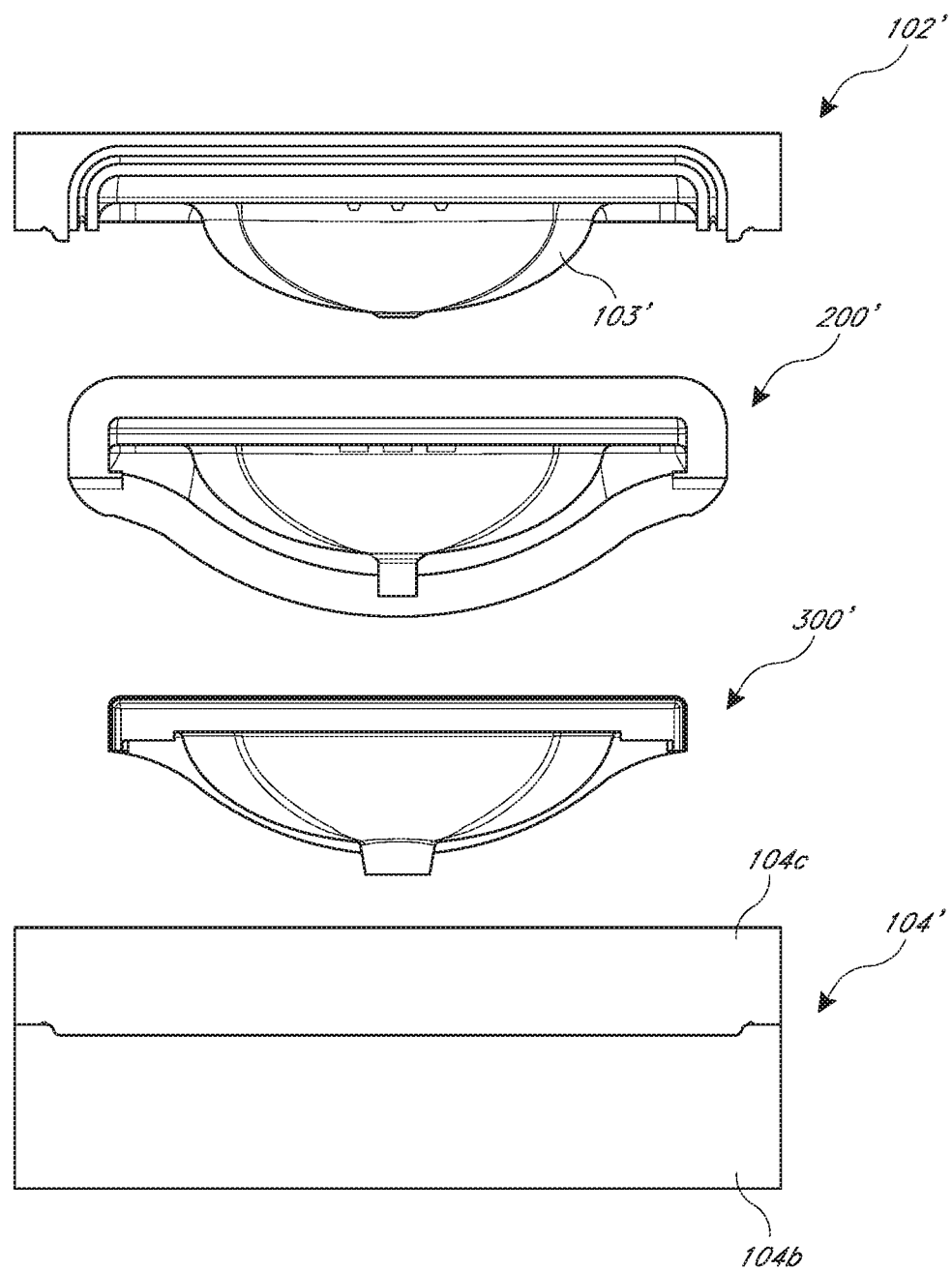
FIG. 4A is a rear exploded view of the mold assembly of FIG. 4.
Figure 4B:
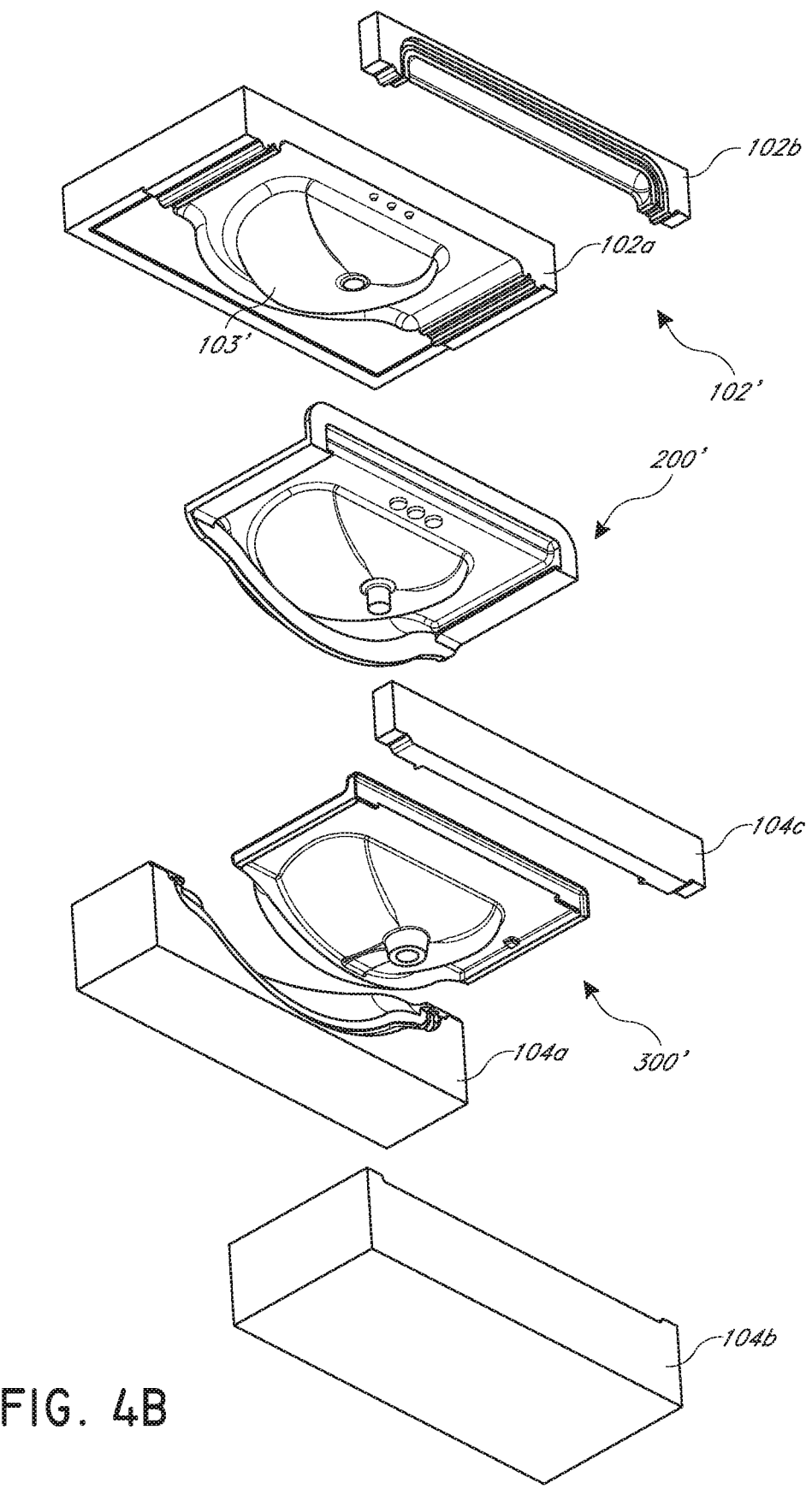
FIG. 4B is a bottom perspective exploded view of the mold assembly of FIG. 4.

FIGS. 4-5 illustrate an embodiment of a mold assembly 100' that can have components or portions that are the same as or similar to the components or portions of the mold assembly 100. Numerical reference to components is the same as previously described, except that a prime symbol (') has been added to the reference. Where such references occur, it is to be understood that the components are the same or substantially similar to previously-described components. As illustrated, the male mold plate 102' can include a main plate body 102a and a backing plate portion 102b. In some embodiments, an elastomeric seal is positioned between the main plate body 102a and the backing plate portion 102b. The female mold plate 104' can include a front plate portion 104a. The front plate portion 104a can be removably attached to a main female plate portion 104b. In some cases, the female mold plate 104' includes a removable back plate 104c. One or more elastomeric seals can be positioned between the front plate portion 104a, the main female plate portion 104b, and the back plate 104c. As illustrated in FIG. 5, the width W' of the counter portion 304' of the molded product 300' can be less than the width W of the counter portion 304 of the molded product 300 illustrated in FIG. 3C.

The terms "approximately," "about," "generally" and "substantially" as used herein represent an amount close to the stated amount that still performs a desired function or achieves a desired result. For example, the terms "approximately," "about," "generally," and "substantially" may refer to an amount that is within less than 10% of the stated amount.

Although the mold assembly has been disclosed in the context of certain preferred embodiments and examples, it will be understood by those skilled in the art that the present disclosure extends beyond the specifically disclosed embodiments to other alternative embodiments and/or uses of the mold assembly and obvious modifications and equivalents thereof. In addition, while a number of variations of the mold assembly have been shown and described in detail, other modifications, which are within the scope of this disclosure, will be readily apparent to those of skill in the art based upon this disclosure. It is also contemplated that various combinations or sub-combinations of the specific features and aspects of the embodiments may be made and still fall within the scope of the disclosure. Accordingly, it should be understood that various features and aspects of the disclosed embodiments can be combined with or substituted for one another in order to form varying modes of the disclosed mold assemblies. Thus, it is intended that the scope of the present disclosure herein disclosed should not be limited by the particular disclosed embodiments described above, but should be determined only by a fair reading of the claims that follow.

What is claimed is:

1. A mold assembly for cultured marble molding comprising:
    a mold frame assembly having a male mold portion and a female mold portion configured to removably mate with the male mold portion, the mold frame assembly defining a mold interior when the male mold portion is mated with the female mold portion; and
    a flexible insert configured to fit within the mold interior, the flexible insert having:
        a bowl portion having a product surface and a mold engaging surface configured to releasably mate with a bowl protrusion on the male mold portion; and
        an apron portion integral with the bowl portion, the apron portion having a product surface separated from the product surface of the bowl portion by a gap, the apron portion configured to fit within an apron cavity of the female mold portion, wherein the product surface of the apron portion is concave and curved in a first direction and in a second direction perpendicular to the first direction;
    wherein the mold frame assembly and the flexible insert define a product mold volume when the male mold portion is mated with the female mold portion and the bowl portion is mated with the bowl protrusion, the product mold volume defining a product bowl space at least partially defined by the bowl portion and the apron portion.

2. The mold assembly of claim 1, wherein the mold frame assembly and the flexible insert cooperate to define at least one of a seamless curved side portion and a seamless curved front portion interfacing with the product mold volume, wherein the at least one of the seamless curved side portion and the seamless curved front portion is curved toward the bowl portion.

3. The mold assembly of claim 2, wherein the seamless curved side portion and seamless curved front portion each comprise an upper curved portion and a lower curved portion.

4. The mold assembly of claim 1, wherein the gap between the product surface of the apron portion and the product surface of the bowl portion can be increased by deflecting at least a portion of the apron portion away from the bowl portion.

5. The mold assembly of claim 1, wherein the male mold portion comprises a plurality of separable male mold sections.

6. The mold assembly of claim 1, wherein the female mold portion comprises a plurality of separable female mold sections.

7. The mold assembly of claim 1, wherein the flexible insert is constructed from a resilient material.

8. A mold assembly for cultured marble molding comprising:
    a mold frame assembly having a male mold portion and a female mold portion configured to removably mate with a bowl protrusion on the male mold portion at least partially on a mating plane, the mold frame assembly defining a mold interior when the male mold portion is mated with the female mold portion; and
    a flexible insert configured to fit within the mold interior, the flexible insert having:
        a main body portion defining a bowl portion and having an outer perimeter;
        at least one sidewall extending from the outer perimeter of the main body portion, the at least one sidewall having an upper curved portion and a lower curved portion, both the upper curved portion and the lower curved portion curved toward the main body portion from a vertical plane perpendicular to the mating plane; and
        an apron portion separated from the bowl portion by a gap, wherein the apron portion is concave and curved in a first direction and in a second direction perpendicular to the first direction;
    wherein the mold frame assembly and the flexible insert define a product mold volume when the male mold portion is mated with the female mold portion and the bowl portion is mated with the bowl protrusion, the product mold volume having at least one side portion having an upper curved portion and a lower curved portion, the at least one side portion of the product mold volume being seamless along and between the upper curved portion and the lower curved portion of the at least one side portion.

9. The mold assembly of claim 8, wherein a radius of curvature of the lower curved portion of the at least one sidewall changes along the outer perimeter of the main body portion.

10. The mold assembly of claim 8, wherein a radius of curvature of the upper curved portion of the at least one sidewall changes along the outer perimeter of the main body portion.

11. The mold assembly of claim 8, wherein the gap between the apron portion and the bowl portion can be increased by deflecting at least a portion of the apron portion away from the bowl portion.

12. The mold assembly of claim 8, wherein the flexible insert is constructed from a resilient material.

13. A mold assembly for cultured marble molding comprising:
    a mold frame assembly having a male mold portion and a female mold portion configured to removably mate with the male mold portion, the mold frame assembly defining a mold interior when the male mold portion is mated with the female mold portion; and
    a flexible insert configured to fit within the mold interior, the flexible insert having:
        a bowl portion configured to releasably mate with a bowl protrusion on the male mold portion; and
        an apron portion separated from the bowl portion by a gap, wherein the apron portion is curved in a first direction and in a second direction perpendicular to the first direction;
    wherein the mold frame assembly and the flexible insert define a product mold volume when the male mold portion is mated with the female mold portion and the bowl portion is mated with the bowl protrusion, the product mold volume defining a product bowl space at least partially defined by the bowl portion and the apron portion.

14. The mold assembly of claim 13, wherein the gap between the apron portion and the bowl portion can be increased by deflecting at least a portion of the apron portion away from the bowl portion.

15. The mold assembly of claim 13, wherein the flexible insert is constructed from a resilient material.

16. The mold assembly of claim 13, wherein the bowl portion comprises a mold surface and a product surface, the product surface of the bowl portion being convex and curved in the first direction and in the second direction, and wherein the apron portion comprises a product surface that is concave and curved in both the first and second directions.

* * * * *